E. SWEETLAND.
Cleaning Grain and Flour, &c.
No. 53,502. Patented March 27, 1866.
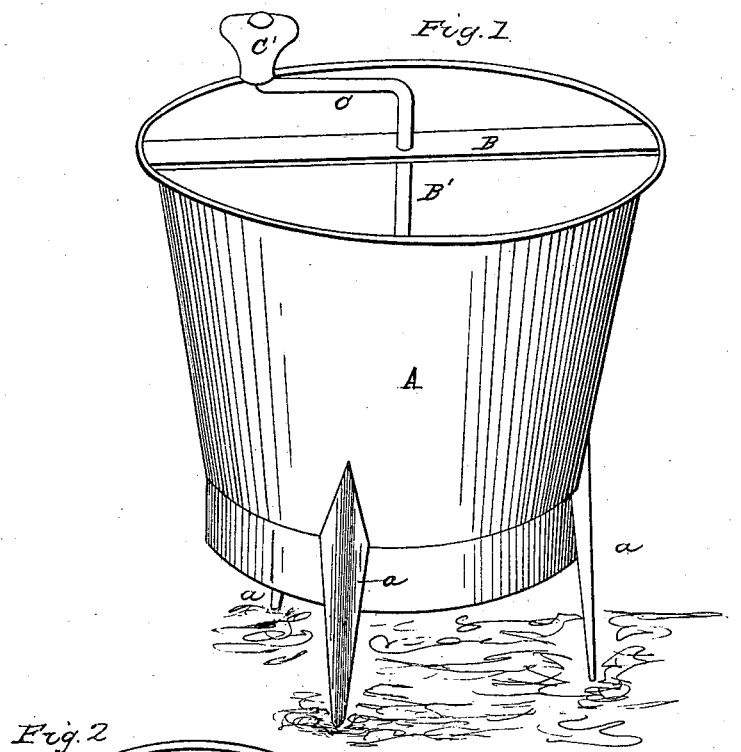
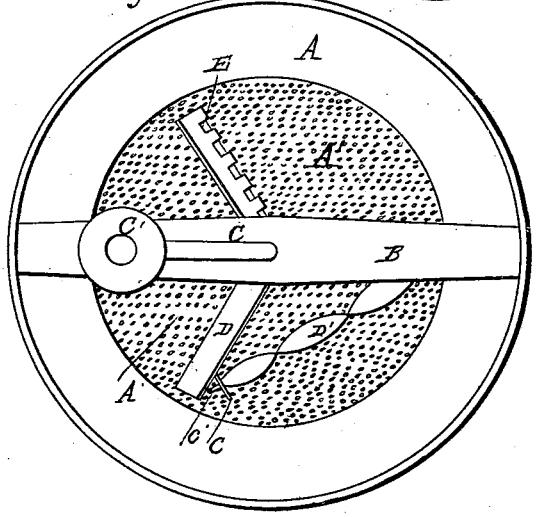
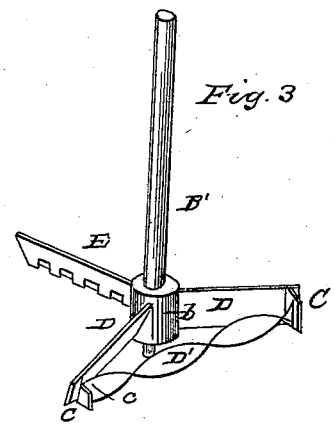
Witnesses
W. H. Burridge
Frank Alden
Inventor
Eugene Sweetland

UNITED STATES PATENT OFFICE.

E. SWEETLAND, OF SOUTH BEND, INDIANA.

IMPROVEMENT IN MACHINES FOR CLEANING GRAIN, &c.

Specification forming part of Letters Patent No. 53,502, dated March 27, 1866.

*To all whom it may concern:*

Be it known that I, E. SWEETLAND, of South Bend, in the county of St. Joseph and State of Indiana, have invented certain new and useful Improvements in a Machine for Sifting and Cleaning Grain, Flour, &c.; and I do hereby declare that the following is a full and complete description of the construction and operation of the same, reference being had to the accompanying drawings, making a part of this specification in which—

Figure 1 is a perspective view. Fig. 2 is a top view. Fig. 3 is a perspective view of the shaft with the wings connected.

Like letters of reference refer to like parts in the views.

My improvement relates to a machine for sifting and cleaning grain, flour, &c., as hereinafter described.

In the drawings, A represents the case of the machine, of the form shown in the drawings, and is supported by legs $a$, that extend up onto the side of the case. The bottom of this case forms a sieve or screen, A'. (Seen in Fig. 2.)

B represents the bridge-tree that extends across the top of the case, and through which the shaft B' passes, forming a crank, C, with a handle, C'. This shaft has its bearing or step below the sieve.

On the lower end of this shaft, and resting on the sieve or screen, is the hub $b$, to which are connected wings, as shown in Fig. 3. The two wings D and wing E are inclined so that they will be on an angle of about forty-five degrees with the plane of the sieve, with the screw D' between them. The lower portion of the wing E may be formed into teeth or blades, every alternate one being in advance of the other, as shown in Figs. 2 and 3.

When the crank is turned the wings which are connected to the hub of the shaft are also turned round, and as the screw D' passes through the grain or flour it turns over the pins $c'$ at each end of said screw, turning and resting in lugs $c$, that project from the wings D. The screw thus turning over as it is also passing round with the wings agitates the grain, flour, or meal and prevents it from packing down onto the sieve, and the wings also aid in keeping it agitated, the wing E being for the same purpose as the screw, loosening and stirring the grain, flour, or meal, allowing it to pass through the sieve rapidly and easily.

There may be any desired number of wings and they can be placed at any angle, and the machine may be operated by a series of inclined wings alone.

This device may be applied to a flour-cooler.

What I claim as my improvement, and desire to secure by Letters Patent, is—

The arrangement of the radial and inclined wings D and E and case A, in combination with the shaft B', crank C, and screw D', in the manner and for the purpose set forth.

EUGENE SWEETLAND.

Witnesses:
W. G. GEORGE,
W. D. KINGERY.